United States Patent Office 3,487,306
Patented Dec. 30, 1969

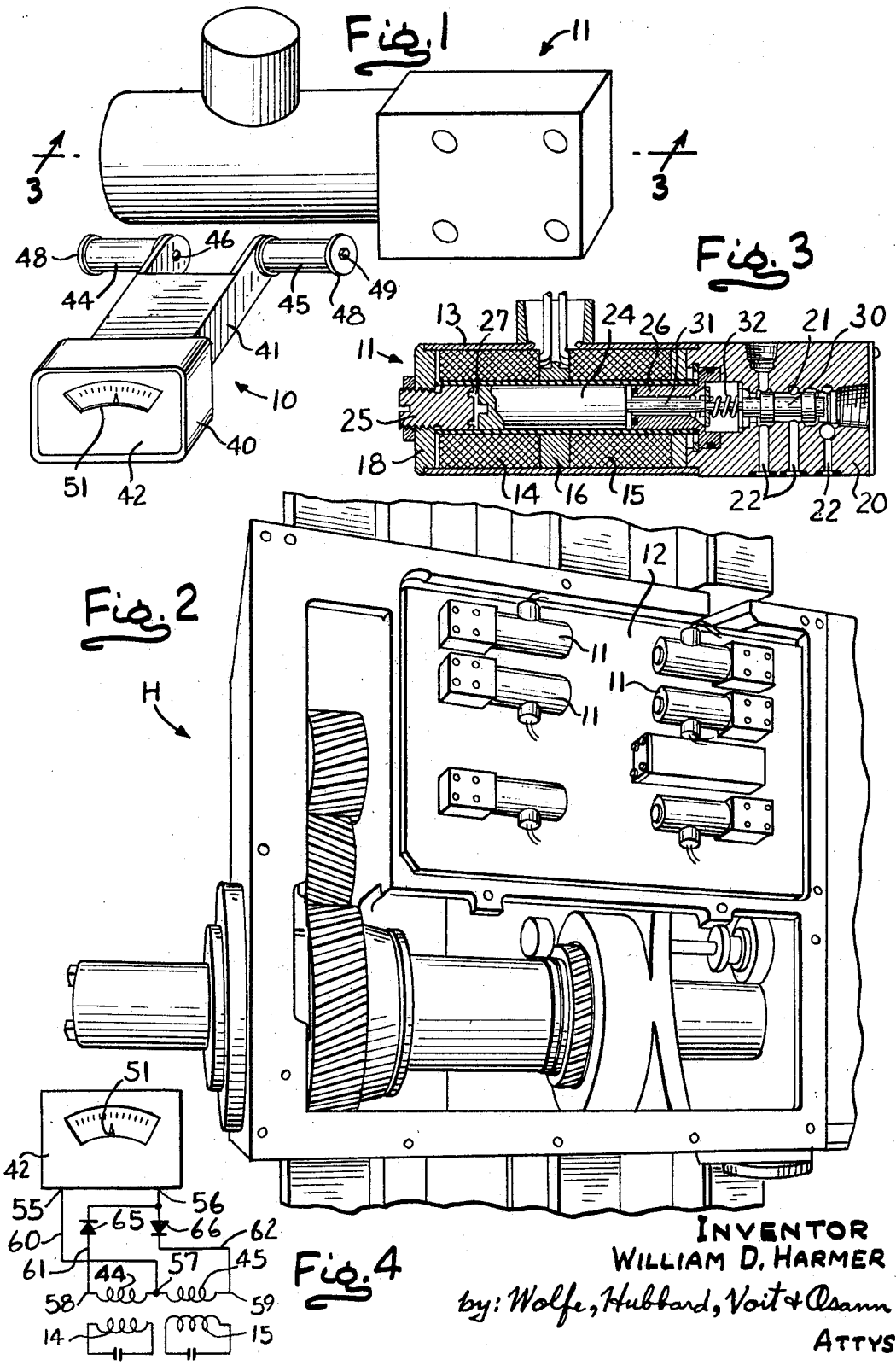

3,487,306
INSTRUMENT FOR CHECKING ENERGIZATION OF SOLENOID VALVES AND POSITION OF VALVE PLUNGER
William D. Harmer, Fond du Lac, Wis., assignor to Giddings & Lewis, Inc., Fond du Lac, Wis., a corporation of Wisconsin
Filed Oct. 4, 1965, Ser. No. 492,502
Int. Cl. G01r *19/14*
U.S. Cl. 324—133        1 Claim

ABSTRACT OF THE DISCLOSURE

A compact portable instrument for checking the operating condition of solenoid valves without exposing the electrical circuitry of the valve or dismantling the valve. The instrument inludes an indicator meter and a pair of axially aligned pick-up coils which may be placed substantially adjacent the valve solenoids, the pick-up coils each being capable of utilizing a magentic field produced by an adjacent energized solenoid to produce a current causing said meter to indicate the location of the energized solenoid and position of the valve plunger.

---

The present invention relates generally to electrical metering devices, and more particularly to an instrument for checking the operating condition of solenoid operated hydraulic valves.

Solenoid operated hydraulic valves are widely employed in various types of machines to regulate the pressure fluid circuits that control machine operations. Solenoid valve assemblies are normally completely enclosed so that it is impossible to tell from external appearances what the valve position of an individual assembly is or whether the assembly is operating properly. In the past, it has been necessary for a mechanic to trace the electrical circuit for a particular solenoid and then use an electrical meter at some accessible location remote from the valve to determine whether or not the solenoid is energized. This is time consuming and often inaccurate. Moreover, if there happens to be an "open" in the coil itself, such a meter check will not suffice.

Accordingly, it is an object of the present invention to provide a checking instrument capable of indicating the condition of a solenoid operated valve in a control system without the necessity of exposing the electrical circuitry of the valve or dismantling the valve assembly.

Another object of the invention is to provide an instrument of the character set forth above that is adapted to detect which one of a pair of solenoids in a solenoid operated valve is energized.

Still another object is to provide an instrument of the foregoing type capable of utilizing the alternating magnetic field associated with an energized valve solenoid so as to develop a current flow detectible by the instrument without the necessity for disassembling the valve.

A further object is to provide an instrument as characterized above that is capable of determining whether the plunger assembly of a solenoid valve has operated improperly by hanging or sticking in partially shifted position, and is so, indicating that position.

Other objects and advantages will become apparent as the following description proceeds, taken together with the accompanying drawings, wherein:

FIGURE 1 is a perspective view of an illustrative instrument embodying the present invention in a position adjacent to a solenoid operated hydraulic valve;

FIG. 2 is a side elevational view of the headstock of a machine tool with the side portion of the housing removed so as to show a panel of solenoid operated valves contained therein;

FIG. 3 is a vertical sectional view of the valve shown in FIG. 1 taken in the plane of line 3—3;

FIG. 4 is a schematic diagram of the electrical circuitry contained in the instrument and valve shown in FIG. 1.

While the invention is susceptible of various modifications and alternative constructions, certain illustrative embodiments thereof have been shown in the drawings and will be described below in detail. It should be understood, however, that there is no intention to limit the invention to the specific forms disclosed, but, on the contrary, the intention is to cover all modifications, alternative constructions, and equivalents falling within the spirit and scope of the invention as expressed in the appended claims.

Referring more specifically to FIG. 1, the invention is there exemplified in a portable checking instrument 10 shown in association with a solenoid operated hydraulic valve 11. The instrument 10 is self-contained and sufficiently compact that it may readily be held in the hand of the mechanic when in use.

One environment in which the intsrument 10 finds particular utility is in a large machine tool with a hydraulic control system utilizing a number of solenoid operated valves. By way of example, there is shown the headstock H of a boring and milling machine having a plurality of solenoid operated hydraulic valves 11 of a well-known type mounted on a panel 12 within the headstock. The machine illustrated represents only one of many types of machines which employ solenoid valves to regulate the flow of fluids used in carrying out machine operations.

The construction of a typical solenoid valve is shown in FIG. 3. The illustrated valve includes a housing 13 containing two axially spaced annular magnetic coils or solenoids 14, 15 having a spacer 16 interposed therebetween. A cap 18 is provided at one end of the housing while a valve body 20 having a central axial passageway 21 and radially branching ports 22 is secured to the opposite end. A cylindrical magnetic armature 24 is slidably disposed between stop members 25, 26 in the axial chamber 27 defined within the solenoids 14, 15 and separator 16. A valve spool 30 is connected to the armature 24 by a rod 31 which is slidably disposed through the stop member 26 and is subject to the biasing influence of the spring 32. The armature 24, spool 30 and rod 31 together constitute a unitary valve plunger assembly.

In operation, the armature 24 is moved from one side of the cylindrical chamber 27 to the other in response to energization of a respective one of the solenoids 14, 15. When neither solenoid is activated, the spring 32 causes the armature 24 to be located centrally within the chamber 27. As the solenoid 15 on the right side of the valve is energized, te magnetic field resulting therefrom causes a force to be exerted upon the armature 24 pulling it to the right against the action of the spring 32. When the right solenoid 15 is deactivated and the left solenoid 14 is energized creating a magnetic field, the armature 24 is moved to the left due to the force of the magnetic field and the biased spring 32. Since the valve spool 30 is rigidly connected to the armature 24, the valve spool is moved in the axial passageway 21 to open and close the appropriate radial ports 22.

In checking out a new machine or servicing an existing one, it is often desirable to determine which one of the pair of solenoids is energized as well as the position of the valve plunger assembly within the valve chamber. As noted above, since the valve assembly and solenoids are completely enclosed, this procedure has been extremely difficult and time consuming.

In accordance with the present invention an instrument 10 is provided that is adapted to determine which one of a pair of solenoid valve coils is energized and to indicate the position of the valve plunger without the necessity for dismantling the valve. To this end, the instrument is adapted to utilize the alternating magnetic field associated with an energized solenoid coil to develop a current flow detectable by the instrument. In the illustrated embodiment the instrument 10 includes a head piece 40 secured to an arm member 41, both members being made of a nonmagnetic material such as copper or plastic. The head piece 40 carries a galvanometer 42 of a commonly known type while the arm member 41 supports a pair of axially alined and laterally projecting pick-up coils 44 and 45. In the illustrated form each coil is supported on a bolt 46 disposed through a finger portion 47 of the arm member with a cap 48 secured against the coil by a nut 49 to maintain the coil securely in position.

The galvanometer 42 is electrically connected to the pair of coils 44 and 45 in such a manner that the galvanometer needle 51 will deflect in the direction of the coil in which a current is generated. As shown in FIG. 4, the galvanometer 42 has electrical connections 55 and 56 provided at opposite sides of the meter. The pair of instrument coils 44 and 45 have a common lead 57 that is connected to the meter connection 55 by a line 60. The leads 58 and 59 at the opposite ends of the coils 44 and 45, respectively, are connected to the meter connection 56 through lines 61 and 62. The line 61 carries a diode 65 in such a manner as to only permit a flow of current through the line in a direction toward the galvanometer. Line 62 carries an oppositely connected diode so as to only permit a flow of current through line 62 in a direction away from the galvanometer.

In using the instrument to check the operating condition of a double solenoid valve, the instrument is held against the valve to be tested so that the pick-up coils 44, 45 will lie closely adajacent and in juxtaposed alignment with the solenoids contained in the valve housing. If one of the solenoids of the valve is energized, an alternating flux will be developed which will pass through the valve housing and the adjacent instrument pick-up coil. The wires of the instrument coil have the effect of cutting the lines of flux causing a current to be generated in that coil which directionally operates the meter to indicate the coil of the valve that is energized. In the illustrated case, the instrument may be placed against the valve housing 13 in such a manner that the pick-up coils 44 and 45 are adjacent the solenoids 14 and 15, respectively. If the right solenoid 15 is energized by an alternating current, the resulting lines of flux will generate a current in the coil 45 of the instrument. The current will flow through line 60, the meter 42, line 62, the diode 66, and back to the coil 45, causing the needle to deflect to the right side. The diode 65 will block current flow through the coil 44 and line 61. Likewise, if the left solenoid 14 is energized, a current will be generated in the pick-up coil 44. The current will flow through the diode 65, line 61, the meter 42, line 60, and back to coil 44, causing the needle to deflect to the left. The current flow will be blocked from passing through the coil 45 and line 62 by the diode 66. In each of the above examples, the meter will deflect in the direction of the coil that is energized by reason of the fact that the connections 55 and 56 of the meter are made positive in relation to whether the coil 44 or 45 is energized.

In addition to determining which solenoid of a pair is energized, the instrument of the present invention is adapted to indicate whether the valve has operated improperly by sticking or hanging in a partially shifted position. When a solenoid is energized and the armature 24 has only partially shifted to one side of the valve chamber 27, the deflection of the meter will be somewhat less than when the valve has properly operated. Since the armature is not positioned within the solenoid to as great an extent as when the valve has completely shifted, the reluctance of the solenoid is increased, causing a reduction in the magnetic flux produced by the solenoid. Since the flux produced by the solenoid is decreased, a lesser current is generated in the instrument coil with a proportional reduction in the meter deflection. The instrument may be calibrated specifically for the deflection of particular types of solenoid valves operating under normal condition, or the normal deflection may be determined by a comparison of tests of several similar valves.

In the illustrated form, the pick-up coils 44 and 45 of the instrument preferably are wound with 3600 turns of number 36 wire and have a resistance of 500 ohms. The diodes should have a peak inverse voltage rating sufficiently high to prevent the break down of the diode due to an inductive kick from the coils of the instrument. The PIV rating preferably should be in the range of 600 volts.

Although the instrument has been illustrated for use on a solenoid valve in which the solenoids are spaced apart a distance equal to the spacing of the instrument coils, it should be understood that the principles of the present invention may be applicable in checking valves in which the coils are not spaced equal to those of the instrument. In such a case, one instrument coil should be positioned as nearly as possible adjacent a solenoid. Such placement may be accomplished by locating the instrument at a position where a maximum deflection occurs on the indicator. As described above, the direction of needle deflection will indicate which instrument coil is in the magnetic field of an adjacent energized solenoid. Since the second solenoid is de-energized, the instrument deflection is not affected by the fact that the second instrument coil is not adjacent the other solenoid coil.

I claim as my invention:

1. An instrument for use in testing solenoid valves which includes axially aligned solenoid coils contained within a housing and adapted to be energized to produce a magnetic field and affect axial movement of a valve plunger between said coils, comprising an arm member, a galvanometer secured at one end of said arm member having an indicator and two terminals, a pair of axially aligned pick-up coils secured in spaced relation at the other end of said arm member, said galvanometer, arm member and pick-up coils forming a portable unitary device capable of being selectively positioned against a solenoid valve housing with said pick-up coils substantially adjacent said solenoid coils and in juxtaposed alignment therewith, a conductor connecting a common lead at one end of each of said pick-up coils to one terminal of said galvanometer, a second conductor connecting the opposite end of one of said pick-up coils to the second terminal of said galvanometer, a third conductor connecting the opposite end of the second pick-up coil to said second galvanometer terminal, said second conductor having a diode adapted to permit the flow of current therein only in a direction toward said galvanometer, said third conductor having a diode adapted to permit the flow of current therein only in a direction away from said galvanometer, and said pick-up coils each being adapted to utilize without disassembling said housing or using an external source of power the magnetic field produced by an energized solenoid adjacent thereto to produce a current causing the indicator of said galvanometer to deflect in the direction of the energized solenoid and to indicate the position of said valve plunger within said valve.

References Cited

UNITED STATES PATENTS

| | | | |
|---|---|---|---|
| 2,103,179 | 12/1937 | Rennau | 324—52 |
| 2,374,166 | 4/1945 | Beach et al. | 324—8 XR |
| 2,428,326 | 9/1947 | Fay | 324—67 |
| 2,124,577 | 7/1938 | Knerr | 324—37 XR |
| 2,436,741 | 2/1948 | Bussey | 324—119 |
| 2,454,807 | 11/1948 | Kennedy | 324—119 XR |
| 2,501,598 | 3/1950 | Eltenton et al. | 324—67 |
| 2,744,232 | 5/1956 | Shawhan et al. | 324—3 |
| 3,075,144 | 1/1963 | Cooper | 324—34 |
| 3,076,931 | 2/1963 | Jasper | 324—67 XR |

GERARD R. STRECKER, Primary Examiner

U.S. Cl. X.R.

324—47, 67